US012536655B2

(12) United States Patent
Vdovjak et al.

(10) Patent No.: US 12,536,655 B2
(45) Date of Patent: Jan. 27, 2026

(54) DETECTING ABNORMALITIES IN AN X-RAY IMAGE

(71) Applicant: KONINKLIJKE PHILIPS N.V., Eindhoven (NL)

(72) Inventors: Richard Vdovjak, Waalre (NL); Dimitrios Mavroeidis, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 193 days.

(21) Appl. No.: 18/271,692

(22) PCT Filed: Mar. 15, 2022

(86) PCT No.: PCT/EP2022/056675
§ 371 (c)(1),
(2) Date: Jul. 11, 2023

(87) PCT Pub. No.: WO2022/194855
PCT Pub. Date: Sep. 22, 2022

(65) Prior Publication Data
US 2024/0062367 A1 Feb. 22, 2024

(30) Foreign Application Priority Data

Mar. 18, 2021 (EP) .................... 21163443

(51) Int. Cl.
G06T 7/00 (2017.01)
(52) U.S. Cl.
CPC .. *G06T 7/0012* (2013.01); *G06T 2207/10116* (2013.01); *G06T 2207/20081* (2013.01);
(Continued)

(58) Field of Classification Search
CPC ................ G06T 7/0012; G06T 7/0014; G06T 2207/20081; G06T 2207/20084;
(Continued)

(56) References Cited

U.S. PATENT DOCUMENTS 6,058,322 A * 5/2000 Nishikawa ............ G06T 7/0012
382/128
10,043,088 B2 * 8/2018 Odry ................ G06V 30/19173
(Continued)

OTHER PUBLICATIONS https://www.fda.gov/media/122535/download, Proposed Regulatory Framework for Modifications to Artificial Intelligence/Machine Learning (AI/ML)-Based Software as a Medical Device (SaMD)—Discussion Paper and Request for Feedback, FDA, US Food and Drug Administration, downloaded on Jul. 7, 2023, pp. 1-20.
(Continued)

*Primary Examiner* — Courtney Joan Nelson

(57) ABSTRACT

The invention relates to a system (200) for detecting one or more abnormalities in an x-ray image using an image classifier and one or more feature extractors. An abnormality is indicative of a pathology, a disease or a clinical finding present in the x-ray image. The feature extractors extract respective image quality features from the x-ray image indicative of a suitability of the x-ray image for detection of the abnormalities. The one or more feature extractors are applied to the x-ray image to determine the respective image quality features for the x-ray image. The image classifier is applied to the x-ray image to determine the classification scores for the one or more abnormalities. The image classifier has been trained to use the determined image quality features to determine said classification scores. A classification result is output based on the determined classification scores.

20 Claims, 4 Drawing Sheets

(52) U.S. Cl.
CPC ............... *G06T 2207/20084* (2013.01); *G06T 2207/30061* (2013.01); *G06T 2207/30168* (2013.01)

(58) Field of Classification Search
CPC . G06T 2207/30168; G06T 2207/10016; G06T 2207/10116; G06T 2207/30004; G06T 7/0002; G06T 3/4046; G06T 1/0007; G06T 2210/41; G06T 2207/30061; G06V 10/82; G06V 10/764; G06V 10/806; G06V 10/993; G06V 10/40; G06V 10/20; G06V 30/19173; G06V 30/18; A61B 5/7267; A61B 5/7264; G06N 3/08; G06N 20/00; G16H 50/20; G16H 30/20; G16H 30/40; G16H 50/30; G16H 10/60
See application file for complete search history.

(56) References Cited

U.S. PATENT DOCUMENTS

2018/0137244 A1* 5/2018 Sorenson ............... A61B 8/565
2020/0357117 A1* 11/2020 Lyman .................. G06T 7/0012

OTHER PUBLICATIONS

Kashyap et al., "Artificial intelligence for point of care radiograph quality assessment", Proceedings of Spie, vol. 10950 109503K-1, SPIE Medical Imaging, 2019, San Diego, California, United States.
International Search report and Written Opinion of PCT/EP2022/056675, dated Jul. 1, 2022.

* cited by examiner

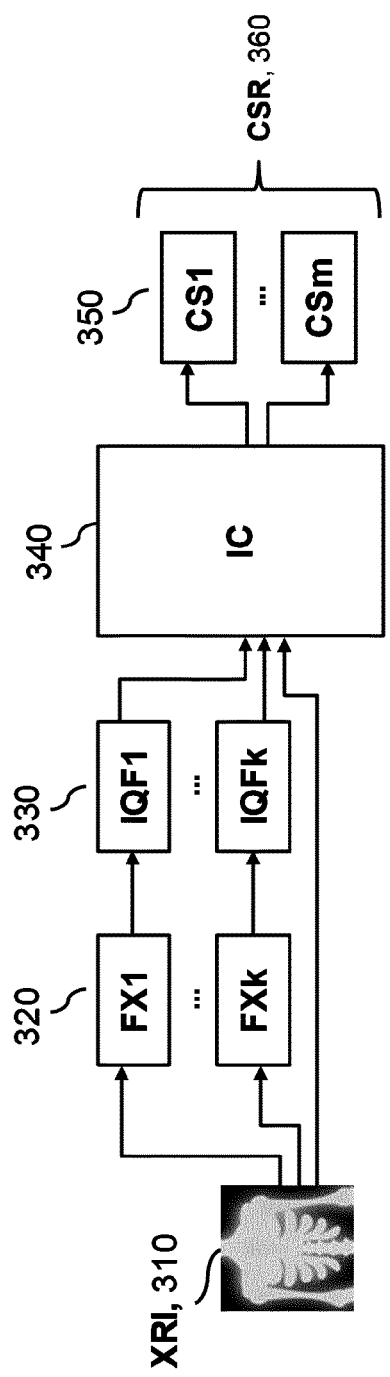
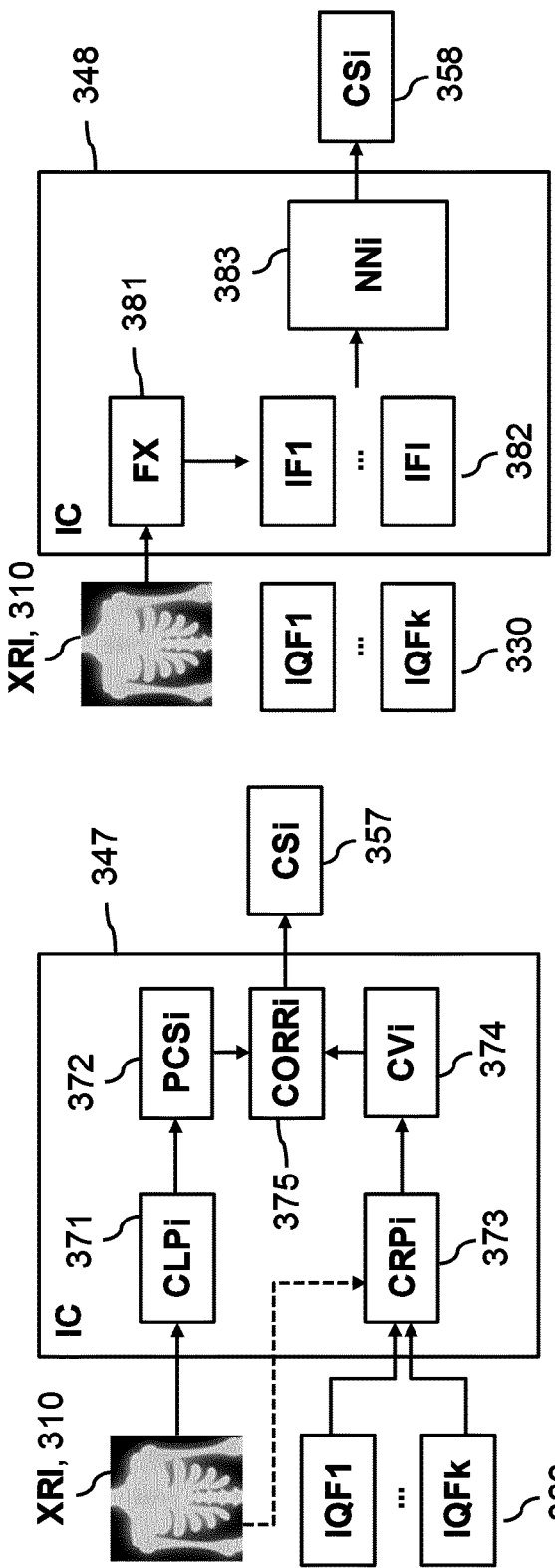

DETECTING ABNORMALITIES IN AN X-RAY IMAGE

CROSS-REFERENCE TO PRIOR APPLICATIONS

This application is the U.S. National Phase application under 35 U.S.C. § 371 of International Application No. PCT/EP2022/056675, filed on Mar. 15, 2022, which claims the benefit of European Patent Application No. 21163443.1, filed on Mar. 18, 2021. These applications are hereby incorporated by reference herein.

FIELD OF THE INVENTION

The invention relates to a system for detecting one or more abnormalities in an x-ray image, and to a corresponding computer-implemented method. The invention further relates to a system for training an image classifier to detect one or more abnormalities in an x-ray image, and to a corresponding computer-implemented method. The invention further relates to a computer-readable medium.

BACKGROUND OF THE INVENTION

Due to relative affordability and high diagnostic impact, the x-ray modality in general, and chest x-ray exams in particular, are frequently used in the course of diagnosing and screening a multitude of diseases as well as treatment monitoring, surgery planning and outcome assessment.

Interpretation of x-ray images is usually performed by doctors, but machine learning techniques are being used more and more to provide assistance. In particularly, image classification may be used to detect abnormalities in an x-ray image, which can then be e.g. flagged to a doctor for further analysis. Such an image classifier is typically trained on a training dataset comprising training images labelled with a set of applicable abnormalities.

Interpretation of x-ray images, for example chest x-ray images, is relatively complex as the actual image projects a 3D object, e.g., the chest, including its internal structures, onto a film/sensor plane. Various factors, including the patient placement and the x-ray beam positioning, have a profound effect on how this resulting projection looks like and what can and cannot be seen.

In an ideal situation, the exam is taken while the patient is standing upright with his or her back towards the x-ray source (the so-called PA view) and carefully positioned perpendicularly against the x-ray beam. Ideally, the x-ray source is also at an optimal distance to assure an adequate x-ray penetration of the soft, as well as hard tissues of the body, resulting in a proper exposure of the image. It is also desirable if the patient's chest is properly inspired, e.g., if the patient takes and holds a deep breath. Such exam is usually taken in an ambulatory setup in a controlled setting of the radiology department. However, many patients that require a chest x-ray exam, are too sick to be able to take an ambulatory chest x-ray exam, they often require the exam to be taken in his or her hospital room, under reduced mobility, or even unconscious. This presents a large variety of variations and deviations from the above ideal scenario.

SUMMARY OF THE INVENTION

One of the objects of the invention is to perform automated detection of abnormalities in an x-ray image with increased diagnostic accuracy, for example, an improved false positive rate and/or false negative rate. Another object of the invention is to perform automated detection of abnormalities in an x-ray image with improved interpretability, e.g., with better feedback on why a certain abnormality was or was not detected.

A first aspect of the invention provides a system for detecting one or more abnormalities in an x-ray image, wherein an abnormality of the one or more abnormalities is indicative of a pathology, a disease or a clinical finding present in the x-ray image, the system comprising:
  a data interface for accessing model data, wherein the model data includes data representing an image classifier trained to use one or more image quality features to determine classification scores for the one or more abnormalities from the x-ray image, and wherein the model data further includes data representing one or more feature extractors configured to extract respective image quality features from the x-ray image indicative of a suitability of the x-ray image for detection of the one or more abnormalities;
  an input interface for obtaining the x-ray image;
  a processor subsystem configured to:
    apply the one or more feature extractors to the x-ray image to determine the respective image quality features for the x-ray image;
    apply the image classifier to the x-ray image to determine the classification scores for the one or more abnormalities, wherein the image classifier uses the determined image quality features to determine said classification scores;
    output a classification result based on the determined classification scores.

A second aspect of the invention provides a system for training an image classifier to detect one or more abnormalities in an x-ray image, the system comprising:
  a data interface for accessing training data comprising multiple training images, a training image being labelled with one or more image quality features and/or one or more abnormalities;
  a processor subsystem configured to train the image classifier to, given a training image and using the one or more image quality features that the training image is labelled with, detect the one or more abnormalities that the training image is labelled with.

A third aspect of the invention provides a computer-implemented method of detecting one or more abnormalities in an x-ray image, wherein an abnormality of the one or more abnormalities is indicative of a pathology, a disease or a clinical finding present in the x-ray image, the method comprising:
  accessing model data, wherein the model data includes data representing an image classifier trained to use one or more image quality features to determine classification scores for the one or more abnormalities from the x-ray image, and wherein the model data further includes data representing one or more feature extractors configured to extract the respective image quality features from the x-ray image indicative of a suitability of the x-ray image for detection of the one or more abnormalities;
  obtaining the x-ray image;
  applying the one or more feature extractors to the x-ray image to determine the respective image quality features for the x-ray image;
  applying the image classifier to the x-ray image to determine the classification scores for the one or more abnormalities, wherein the image classifier uses the determined image quality features to determine said classification scores;

outputting a classification result based on the determined classification scores.

A fourth of the invention provides a computer-implemented method of training an image classifier to detect one or more abnormalities in an x-ray image, the method comprising:

accessing training data comprising multiple training images, a training image being labelled with one or more image quality features and/or one or more abnormalities;

training the image classifier to, given a training image and using the one or more image quality features that the training image is labelled with, detect the one or more abnormalities that the training image is labelled with.

A fifth aspect of the invention provides a computer-readable medium comprising transitory or non-transitory data representing respective instructions which, when executed by a processor system, cause the processor system to perform respective computer-implemented method according to an embodiment; and/or an image classifier for detecting one or more image abnormalities in an x-ray image trained according to the computer-implemented method according to an embodiment.

Embodiments are defined in the dependent claims.

A system in accordance with the first aspect of the invention, and a method in accordance with the third aspect of the invention, use an image classifier to determine classification scores for one or more abnormalities from an x-ray image. Interestingly, to determine these classification scores, the image classifier uses not just the x-ray image itself, but also image quality features that were extracted for the x-ray image by one or more feature extractors separate from the image classifier.

An image quality feature is a feature that is indicative of an image quality of the x-ray image. The image quality is generally referred to as the weighted combination of all of the visually significant attributes of an image. In particular, an image quality feature is a feature that is visually significant for the detection of at least one of the abnormalities detected by the system. For example, the set of image quality features may include features representing a type of view, a rotation degree, a degree of inspiration, and/or a degree of penetration. The feature extractors used to extract the image quality features may be referred to as "image quality assessment models".

X-ray images specifically have the problem that there is a large degree of variability in image quality features. Whereas other types of medical images such as MRI or CT are typically captured under controlled and consistent conditions, for x-ray, the variability in capturing conditions (e.g., perspective, device settings, etc.) is typically much larger. For example, the ability to enforce uniform conditions in x-ray is often limited by the patient's condition and/or environment.

Compared to other medical imaging modalities, it is thus particularly advantageous for x-ray images to take into account the large variability in measurement conditions that exists in x-ray. In particular, whether or not a particular abnormality can be detected from a particular x-ray image may depend largely on the imaging conditions whereas for other medical imaging modalities this is much less the case. X-ray images are 2-dimensional images and are also sometimes referred to as "projectional x-ray images" to distinguish them from 3-dimensional images such as CT scans.

By letting a separate feature extractor determine these image quality features and providing these image quality features as an input to the image classifier, the image classifier gets useful information that can be used to assess how the image quality may impact a particular diagnostic call. Accordingly, these image quality features can prompt the image classifier to output a different classifier score for an abnormality if the circumstances indicated by the quality features so dictate.

For example, image quality features indicating poor inspiration and/or low volume may cause the image classifier to output a lower classification score for the detection of pulmonary edema, compared to the classification score it may output if these image quality features indicate good inspiration and higher volume. As a consequence, for example, the risk of the image classifier outputting false positives for pulmonary edema in such situations where it is hard to assess properly, is reduced. More generally, image quality features indicating low image quality, in the sense that the image quality features indicate a decreased suitability (e.g., worse than average) of the image for the detection of a certain abnormality, may lead to a reduced classification score. Thus, in some cases, an abnormality may be rejected as a false positive based on the image quality features. Accordingly, an improved false positive rate may be achieved.

On the other hand, image quality features indicating a high image quality in the sense of an increased suitability (e.g., better than average) of the image for the detection of an abnormality, may lead to an increased classification score and thus to an improved false negative rate.

In the above example, low image quality for certain image quality features is effectively considered a factor that increases the risk of false positives, and thus leads to a lower classification score. However, it may also in some cases be beneficial to increase a classification score in the case of low image quality. For example, if an abnormality is observed despite the low image quality making this difficult, this may be regarded as an extra strong indication that the abnormality is in fact there. Thus, also in this case, false negatives may be reduced. False negatives may instead or in addition be reduced by outputting a subset of abnormalities that may be undetected, as discussed elsewhere. Similarly, in some cases it may be beneficial to decrease a classification score in cases of high image quality, for example if the image quality features indicate that an abnormality should be clear to see but it still cannot be established with sufficient confidence. Thus, also in this case, false positives may be reduced.

Generally, whether lower image quality is arranged to result in an increased or decreased classification score, may differ on a per-abnormality and per-image quality feature basis. Either way, interestingly, by explicitly taking specific image quality aspects into account instead of e.g. ignoring them, more accurate classification scores may be determined, e.g., both the false positive rate and the false negative rate may be improved. Effectively, by providing to the image classifier explicit inputs representing respective image quality aspects, the image classifier is better equipped to deal with the difference between "I cannot see" and "I do not see" an abnormality, and can thus take this into account when determining the classification score.

A classification result may be output that is based on these more accurate classification scores, e.g., that includes the scores or is derived from them (e.g., outputting the abnormality with the highest classification score, outputting abnormalities with classification scores exceeding respective thresholds or a common threshold, etc.). Accuracy of this classification result may thus be improved correspondingly.

The feature extractors used to extract the image quality features are separate from the image classifier at least in that the determined image quality features can be clearly identified as outputs of the feature extractors. These outputs are used as an input by the image classifier at some point when determining the classification scores, whether it be at same time that the image classifier uses the input image or e.g. at a later stage to correct a classification score derived from the input image. The feature extractors are typically trained separately from the image classifier, e.g., in a separate optimization and possibly on different training datasets. The feature extractors also have their own well-defined, and usually human-interpretable, outputs, e.g., they are trained to provide specific respective outputs based on labelled training data with the features as labels.

Explicitly extracting image quality features, especially specific human-interpretable ones, is also advantageous from an interpretability (also called explainability) point of view. For example, some or all of the extracted image quality features can be included in the classification result output by the image classifier in addition to the classification outcomes as an explanation of what factors potentially affected the classification. The selection of feature extractors to use may be based on medical experience and/or may be automated, e.g., based on their impact on the accuracy of the output classification scores.

Although an image classifier that does not get image quality features as an explicit input, might theoretically learn to extract relevant image quality features itself, it may be very hard for such a model to learn to extract the right features, and in particular, such an approach may not allow labels for the image quality features to be used in training to make it easier to learn how to extract them. Moreover, such an approach may not extract human-interpretable features useful for interpretability. Also, since radiologist themselves are also trained to take into account image quality aspects when assessing an x-ray image, a model using image quality features better matches medical practice.

Generally, a feature extractor may, in addition to the visual information contained in the image (e.g., pixel values), also use metadata (e.g. DICOM data) associated with the image as an input when extracting the image quality features from the image. In addition, also image quality features derived just from the metadata may be used. It is even possible to use only image quality features that are derived from metadata, e.g., not to use image quality features that the system extracts itself. For example, these features may have been previously automatically extracted or manually annotated. However, extracting image quality features has as an advantage that manual annotation is not necessary, and also that it is certain that the right feature extractor is used that combines well with the image classifier, e.g., that the same feature extractors are used both when training and when using the image classifier.

In an embodiment, the x-ray image is a chest x-ray image. Chest x-ray images are the most common type of x-ray taken and are known to be suitable for detecting a wide range of abnormalities.

In an embodiment, an abnormality is indicative of a pathology, a disease or a clinical finding present in the x-ray image. It is particularly useful to detect pathologies, e.g., patterns that indicate the presence of diseases, in x-ray images. Such patterns do not directly lead to a diagnosis but typically trigger a follow-up to investigate the abnormality or the disease. However, it is also possible to directly diagnose medical conditions, e.g., a broken bone.

Various types of image quality features are possible, including a type of view, a rotation degree, a degree of inspiration, and a degree of penetration. In an embodiment, all four of these image quality features are used. These features are known to be particularly consequential for the detectability of abnormalities in x-ray images. Generic image classification or feature extraction techniques may be used for the image quality feature extractors. Techniques for extracting specific image quality features are also known in the art.

In an embodiment, an image quality feature represents a type of view. In the field of x-ray, a view (also known as a projection) is known as an indicator of the relative orientation of the body and the direction of the x-ray beam. The view is usually a categorical feature from a set of possible views (e.g., at most or at least 3 possible views, at most or at least 4 possible views, or at most or at least 10 possible views). For example, for chest x-rays, the set of possible views can include a posteroanterior (PA) view, an anteroposterior (AP) view, a lateral view, and/or a lordotic view. It is possible to use a type of view indicated in metadata associated with the x-ray image instead of, or in addition to, an extracted type of view. The type of view is commonly included in the metadata but in practice it often turns out to be inaccurate, which it why it is preferred to include the extracted type of view instead or in addition.

In an embodiment, an image quality feature represents a rotation degree of the x-ray imaging subject with respect to the plane of the x-ray image. The rotation degree may be represented for example as a three-dimensional vector comprising an x-axis rotation angle, a y-axis rotation angle, and a z-axis rotation angle (also referred to as x-axis, y-axis and z-axis rotation degrees). The rotation degree can also be categorical, e.g., derived from determined angles, e.g., "no rotation", "slight rotation", "large rotation in x-direction", etc. Body rotation is relevant for example because it may introduce a hard body structure in front of soft tissues like lungs and obstruct the full view. Determining an image quality feature may for example comprise computing based on the determined rotation angle whether particular structure(s) in the x-ray image is/are likely to be obstructed.

In an embodiment, an image quality feature represents a degree of inspiration indicating whether there is an adequately inspired volume in the image, e.g., sufficient lung volume. The degree of inspiration is typically represented on a one-dimensional scale from poor to good inspiration, e.g., by a number or a categorical variable.

In an embodiment, an image quality feature represents a degree of penetration indicating whether the x-ray image was adequately exposed. The degree of penetration is typically represented on a one-dimensional scale ranging from "too little penetration" (too dark) via "good penetration" to "too much penetration" (too bright/too much contrast), for example, as a number or a categorical variable.

In an embodiment, a classification score for an abnormality may be determined by applying a classification part of the image classifier to the x-ray image to obtain a preliminary classification score for the abnormality; applying a correction part of the image classifier to at least the image quality features to determine a correction value for the preliminary classification score; and applying the correction value to the preliminary classification score to obtain the classification score for the abnormality.

The classification part does not use the image quality features. This has the advantage that for example a known and conventional abnormality detection model can be used that does not take image quality features into account, and also that the classification part can be trained without requiring values for the image quality features. As a consequence, the overall image classifier can be trained on a training dataset for which values for the image quality features are not always available. Being able to use an existing abnormality detection model is also desirable from the point of view of certification by medical authorities such as the FDA, since it may be easier to transfer a certification of the classifier part over to the overall image classifier than the certify the overall image classifier from scratch.

Moreover, using a correction part separate from the classification part effectively forces the image classifier to take the image quality features into account, and reflects the fact that the image itself and the image quality features are different kinds of data (e.g., image versus feature vector) for which different types of machine learning model (e.g., convolutional neural network versus decision tree) may be appropriate. (The image quality features themselves may be extracted using a similar type of network as the classification part, e.g., a convolutional neural network, however.)

The correction part does use the image quality features: at least, when determining a correction value for a given abnormality, it uses those image quality features that are relevant for the abnormality at hand, which may be only a subset of available image quality features. The correction value may be applied e.g. additively, multiplicatively, etc. (in both cases with an optional maximum). Applying the correction value for a particular abnormality may comprise increasing the classification score if the determined image quality features indicate an increased confidence in detecting the abnormality, and/or decreasing the classification score if the determined image quality features indicate a decreased confidence in detecting the abnormality.

The use of separate classification and correction parts is also advantageous from an explainability/interpretability point of view, since the correction value effectively serves as an explanation of the extent to which the image quality features affect the classification score for a particular abnormality.

In an embodiment, applying the correction part comprises applying a rule-based model to at least the determined image quality features. This allows in a straightforward way to implement knowledge available in the field of radiology concerning the impact of image quality on image interpretation.

To accommodate for the quality variability in the way chest x-ray images are acquired when manually inspecting x-ray images, radiologists are typically trained to first systematically assess the image quality and its implications on image interpretation and take this into account when they indicate the potential findings and abnormalities. This introduces transparency into what can be seen in the image and what might be very hard to spot. The medical knowledge that is also used by radiologists and for example available in handbooks, may be translated, for example manually, into rules like "if poor inspiration is detected, then mitigate the increased probability of false appearance of pulmonary edema". Accordingly, for example, rules of the rule-based model may be manually specified based on medical knowledge.

The rules of the rule-based model may also be derived from, or represented as, a medical knowledge base, for example a knowledge graph linking image quality aspects to their impact on abnormality detection. Available knowledge graph representations of such clinical knowledge may be used to derive the rules.

In any case, the rule-based model may be referred to as a clinical knowledge reasoning module. Optionally, training may involve fine-tuning a set of rules of the module, for example, by determining an optimal correction value by which to correct the preliminary classification score, and/or by making a selection of rules found to be (most) effective in increasing accuracy, etc. Instead of or in addition to using rules based on clinical knowledge, rules can be mined from the training data as well.

In an embodiment, the correction part is applied additionally to context information from an imaging request associated with the x-ray image. Such an imaging request typically contains useful information about reasons why the x-ray image was taken, that may be used to obtain a more accurate correction factor.

In an embodiment, a classification score for an abnormality is determined by applying a feature extraction part of the image classification model to the x-ray image to obtain image features of the x-ray image, and applying a further machine-learnable model, such as a neural network, to the image features and the image quality features to obtain the classification score for the abnormality. For example, a conventional and possibly pre-trained (x-ray) image feature extractor may be used. In this alternative, there is no post-processing of a preliminary classification score of a classification part, and instead the image quality features are taken into account directly when computing the classification score. By using an image feature extractor to extract a feature vector representing the image and combining those with the quality features, a model suitable for processing feature vectors, such as a (non-convolutional) neural network or a decision tree, may be used. The feature extractor can be trained together with the further model in a single optimization, or separately; in the latter case, for example, the training may not require quality and/or abnormality labels, e.g., when using an autoencoder.

Optionally, different techniques for determining classification scores may be combined in the same system, e.g., for some abnormalities it may be more desirable to use a combination of a classification part and a correction part, whereas for other abnormalities it may be more desirable to use a feature extractor and a further machine-learnable model. This choice may be influenced by accuracy or by the availability of labelled training data, for example.

In an embodiment, correction data may be included in the classification result. The correction data may indicate an effect of the image quality features on the classification score. For example, the correction data may correspond to or be based on a correction value output by a correction part, as described above. More generally, correction data may be obtained by applying the image classifier to the image with the actually extracted image quality features; applying the image classifier to the image with a fixed (e.g., optimal, or average) set of image quality features; and determining a difference between the resulting classification scores. In any case, outputting a correction value improves interpretability of the classification results by providing information about the extent to which image quality aspects affected the classification. In case a rule-based model was used, the fired rule or rules that resulted in the determined correction value may optionally be included in the correction data as well, further improving interpretability.

In an embodiment, based on the one or more image quality features, a subset of abnormalities is determined that may be undetected due to image quality. This subset of abnormalities may be output as part of the classification result. To determine this subset, the image quality features derived from the x-ray image are used, but typically not the image itself. For example, when using a correction part, the correction part may be applied to the image quality features, with abnormalities with high correction values being reported, or a different model may be used that is of the same type as the correction part (e.g., a different rule-based model) and that is similarly trained. The model used to determine whether a particular abnormality may be undetected based on the quality features can also be a separately trained classifier. When using a rule-based model, as above, rules used by the rule-based model to determine that an abnormality may be undetected may be included in the classification result as well, and can be trained and/or fine-tuned.

In an embodiment, the classification result is output in a sensory-perceptible manner to a user, for example on a screen. The user may be a clinician or doctor, specifically a radiologist or radiology assistant. However, it is also possible to output the classification result, e.g., by associating it with the image as metadata and/or to output the classification result to another system for further automated processing.

A system in accordance with the second aspect of the invention, and a method in accordance with the fourth aspect of the invention, can be used to train an image classifier as discussed above. Various aspects and advantages of the training have been discussed above. Depending on how the image classifier is implemented, its classification part(s) and/or correction part(s); its rule-based model(s) for determining which abnormalities may be undetected; its feature extraction part(s); and/or its further machine learnable model(s) (e.g., neural networks) may be trained (in some cases, fine-tuned). In particular, for a rule-based model for determining correction values, the rule-based model may be trained by mining rules and/or by determining thresholds for given rules based on the training data. Not all component may need to be trained, e.g., pre-trained classification parts or feature extraction parts may be used.

When training both a classification part and a correction part, these parts may be trained separately or jointly. For example, the classifier part may be trained on a training dataset labelled with abnormalities. The correction part may be trained afterwards, on (a subset of) the training dataset labelled with classification scores and image quality features, to determine a correction value that results in the abnormalities that the training image is labelled with. When performing joint training, for example, a single optimization may be performed, wherein for training images for which the needed image quality features are available, both the classification part and the correction part are used, and for training images without the needed image quality features, just the classification part is used. It is noted that, even if the correction part is not trained, it may still be used to train the classification part, e.g., the classification part may be trained or fine-tuned to give optimal results in combination with the correction part.

In some cases, e.g., with a pre-trained classification part and a manually specified rule-based model for determining correction values, no training may be needed at all to make use of the provided techniques.

Optionally, the feature extractors used to determine the image quality features may be trained in addition to training the image classifier.

The above-mentioned advantages apply to the computer-readable medium in accordance with the fifth aspect of the invention as well.

It will be appreciated by those skilled in the art that two or more of the above-mentioned embodiments, implementations, and/or optional aspects of the invention may be combined in any way deemed useful. Modifications and variations of any computer-implemented method and/or any computer readable medium, which correspond to the described modifications and variations of a corresponding system, can be carried out by a person skilled in the art on the basis of the present description.

BRIEF DESCRIPTIONS OF DRAWINGS

These and other aspects of the invention are apparent from and will be elucidated with reference to the embodiments described hereinafter. In the drawings, FIG. 1 shows a system for training an image classifier to detect abnormalities;

FIG. 2 shows a system for detecting abnormalities in an x-ray image;

FIG. 3*a* shows a detailed example of detecting abnormalities in an x-ray image;

FIG. 3*b* shows a detailed example of applying an image classifier comprising a classification part and a correction part;

FIG. 3*c* shows a detailed example of applying an image classifier comprising a feature extractor and a neural network;

Figure 1:
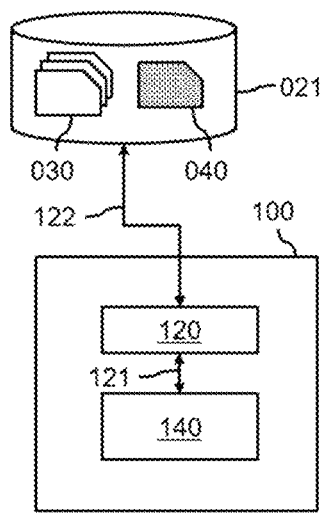

It should be noted that items which have the same reference numbers in different FIGS., have the same structural features and the same functions, or are the same signals. Where the function and/or structure of such an item has been explained, there is no necessity for repeated explanation thereof in the detailed description.

REFERENCE SIGNS LIST

The following list of references signs is provided for facilitating the interpretation of the drawings and shall not be construed as limiting the claims.

021, 022 data storage
072 imaging x-ray detector
030 training data
040 model data
100 training system
120, 220 data interface
140, 240 processor subsystem
121-122, 221-225 communication
200 detection system
260 input interface
280 output interface
282 display data
290 display
292 classification result
310, 410 x-ray image
320 feature extractors
330, 430 image quality features
340 image classifier
350, 357, 358 classification score(s)

360 classification result
371, 472 classification part
372, 472 preliminary classification result
373, 473 correction part
374, 474 correction value
375, 475 correction
381 feature extraction part
382 image features
383 neural network
491-493 classification result
492 indication that abnormality was boosted
494 indication that abnormality was rejected as false positive
496 indication that abnormality may be undetected

DETAILED DESCRIPTION OF EMBODIMENTS

FIG. 1 shows a training system 100 for training an image classifier to detect one or more abnormalities in an x-ray image.

The system 100 may comprise a data interface 120 for accessing training data 030. The training data 030 may comprising multiple training images. A training image may be being labelled with one or more image quality features and/or one or more abnormalities. The data interface 120 may also be for accessing model data 040. The model data 040 may include data representing an image classifier configured to determine classification scores for the one or more abnormalities from the x-ray image. The model data 040 may optionally further include data representing one or more feature extractors configured to extract respective image quality features from the x-ray image indicative of an image quality of the x-ray image.

Figure 2:
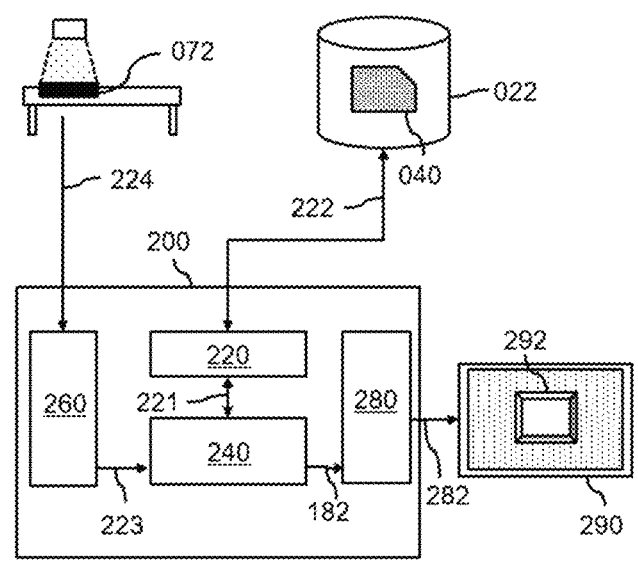

The model data 040 may be for use in detecting abnormalities in an x-ray image according to a method described herein, e.g., by system 200 of FIG. 2.

For example, as also illustrated in FIG. 1, the data interface 120 may be constituted by a data storage interface 120 which may access the data 030, 040 from a data storage 021. For example, the data storage interface 120 may be a memory interface or a persistent storage interface, e.g., a hard disk or an SSD interface, but also a personal, local or wide area network interface such as a Bluetooth, Zigbee or Wi-Fi interface or an ethernet or fiberoptic interface. The data storage 021 may be an internal data storage of the system 100, such as a hard drive or SSD, but also an external data storage, e.g., a network-accessible data storage. In some embodiments, the data 030, 040 may each be accessed from a different data storage, e.g., via a different subsystem of the data storage interface 120. Each subsystem may be of a type as is described above for the data storage interface 120.

The system 100 may further comprise a processor subsystem 140 which may be configured to, during operation of the system 100, train the image classifier 040 to, given a training image and using the one or more image quality features that the training image is labelled with, detect the one or more abnormalities that the training image is labelled with.

The system 100 may further comprise an output interface for outputting trained data 040 representing the learned (or 'trained') image classifier. For example, as also illustrated in FIG. 1, the output interface may be constituted by the data interface 120, with said interface being in these embodiments an input/output ('IO') interface, via which the trained model data 040 may be stored in the data storage 021. For example, the model data defining the 'untrained' model may during or after the training be replaced, at least in part, by the model data of the trained model, in that the parameters of the model, such as weights and other types of parameters of neural networks, may be adapted to reflect the training on the training data 030. This is also illustrated in FIG. 1 by the untrained and trained models coinciding in this FIG. In other embodiments, the trained model data may be stored separately from the model data defining the 'untrained' model. In some embodiments, the output interface may be separate from data interface 120, but may in general be of a type as described above for the data interface 120.

FIG. 2 shows a detection system 200 for detecting one or more abnormalities in an x-ray image. The system 200 may comprise a data interface 220 for accessing model data 040. The model data 040 may include data representing an image classifier (e.g., trained parameters defining the image classifier) configured to determine classification scores for the one or more abnormalities from the x-ray image. The model data may further include data representing one or more feature extractors (e.g., trained parameters defining the feature extractors) configured to extract respective image quality features from the x-ray image indicative of an image quality of the x-ray image. The image classifier may be obtained from a system that has trained it according to a method described herein, e.g., system 100 of FIG. 1. The system 200 may optionally train the image classifier in addition to applying it, e.g., system 200 may be combined with system 100 of FIG. 1.

For example, as also illustrated in FIG. 2, the data interface 220 may be constituted by a data storage interface 220 which may access the data 040 from a data storage 022. In general, the data interface 220 and the data storage 022 may be of a same type as described with reference to FIG. 1 for the data interface 120 and the data storage 021. Although not shown in the FIG., the data storage interface 220 may also act as an input interface for obtaining the x-ray image.

The system 200 may further comprise a processor subsystem 240 which may be configured to, during operation of the system 200, apply the one or more feature extractors to the x-ray image to determine the respective image quality features for the x-ray image. Processor subsystem 240 may further apply the image classifier to the x-ray image to determine the classification scores for the one or more abnormalities. The image classifier may use the determined image quality features to determine said classification scores. Processor subsystem 240 may further output a classification result based on the determined classification scores.

It will be appreciated that the same considerations and implementation options apply for the processor subsystem 240 as for the processor subsystem 140 of FIG. 1. It will be further appreciated that the same considerations and implementation options may in general apply to the system 200 as for the system 100 of FIG. 1, unless otherwise noted.

System 200 may comprise an input interface for obtaining the x-ray image. The FIG. shows an input interface 260 arranged for obtaining x-ray image 224 from an imaging x-ray detector 072, such as an image plate or a flat panel detector as known in the art per se. The imaging x-ray detector 072 may be part of system 200.

The system 200 may comprise an output interface 280 to a rendering device, such as a display, a light source, a loudspeaker, a vibration motor, etc., which may be used to output the classification result by generating a sensory perceptible output signal 282 which may be generated based on the determined classification result. The FIG. shows the output signal 282 being provided to a display 290 for displaying the classification result 292 on the display.

In general, each system described in this specification, including but not limited to the system 100 of FIG. 1 and the system 200 of FIG. 2, may be embodied as, or in, a single device or apparatus, such as a workstation or a server. The device may be an embedded device. The device or apparatus may comprise one or more microprocessors which execute appropriate software. For example, the processor subsystem of the respective system may be embodied by a single Central Processing Unit (CPU), but also by a combination or system of such CPUs and/or other types of processing units. The software may have been downloaded and/or stored in a corresponding memory, e.g., a volatile memory such as RAM or a non-volatile memory such as Flash. Alternatively, the processor subsystem of the respective system may be implemented in the device or apparatus in the form of programmable logic, e.g., as a Field-Programmable Gate Array (FPGA). In general, each functional unit of the respective system may be implemented in the form of a circuit. The respective system may also be implemented in a distributed manner, e.g., involving different devices or apparatuses, such as distributed local or cloud-based servers. In some embodiments, the system 200 may be part of an x-ray imaging device.

FIG. 3a shows a detailed, yet non-limiting, example of detecting abnormalities in an x-ray image.

Shown in the FIG. is an x-ray image XRI, 310. The x-ray image in this example is a 2D greyscale image. The width of the image may be at least 100 pixels. The width of the image may be at most 10000 pixels. The height of the image may be at least 100 pixels. The height of the image may be at least 10000 pixels. In this example, x-ray image XRI is a chest x-ray image.

Shown further are a number of feature extractors FX1, . . . , FXk, 320, configured to extract respective image quality features IQF1, . . . , IQFk, 330, from the x-ray image XRI, indicating of an image quality of the x-ray image XRI. Together, the feature extractors provide a systematic image quality assessment module. The feature extractors FXi are different from the image classifier IC and also extract a different type of information: e.g., the classes into which image classifier IC classifies the x-ray image XRI, are disjoint from the features extracted by the feature extractors FXi.

There can be one or more such feature extractors, for example, at least or at most three, at least or at most four, or at least or at most ten. Although distinct feature extractors are shown to extract the respective image quality features, it will be understood that some or all feature extractors can overlap in whole or in part, e.g., a common model may be applied from which feature extractors FXi take respective outputs. The feature extractors FXi can be a conventional type of machine trainable model for image feature extraction, for example, a neural network such as a deep neural network or a convolutional neural network. Image quality features IQFi can for example be numbers, categorical values, or vectors thereof.

Specifically, the following types of feature extractor were found to be beneficial for the present application:

- a view detection model, e.g., outputting a categorical variable representing whether the view in the x-ray image XRI is a PA view, AP view, lateral view, lordotic view, etc.;
- a rotation detection model, e.g., outputting a three-dimensional vector representing x-axis, y-axis, and z-axis rotation degree for the x-ray image XRI, or a type of rotation derived therefrom (e.g., indicating that rotation was or was not detected, etc.)
- an inspiration assessment model outputting an inspiration assessment for x-ray image XRI, e.g., outputs may indicate adequately inspired volume, poor inspiration and/or low lung volume, etc.;
- a penetration assessment model outputting a penetration assessment for x-ray image XRI, e.g., outputs may indicate that the image is adequately exposed, too bright, too dark, and/or has too much contrast, etc.

Each feature extractor FXi may be trained with a different goal and/or data and/or labels to recognize and assess the degree of a particular quality aspect, e.g., as known in the art per se. For instance, an inspiration assessment may be based on a count of the visible ribs in the chest wall, e.g., inspiration is adequate if 9-10 posterior ribs are visible, or if 6-7 anterior ribs are visible. Once trained, the quality assessment module provides specific assessment of image quality attributes IQF (also referred to as bound quality variables) of an image XRI to be classified.

Shown further is an image classifier IC configured to determine classification scores CS1, . . . , CSm, 350, for one or more abnormalities from the x-ray image XRI. For example, any combination of abnormalities indicative of pathologies, diseases, clinical findings, etc., may be used.

There is in principle no restriction to the number of abnormalities supported, e.g., the number of abnormalities can be one, at least two, at most or at least 10, or at most or at least 50. Interestingly, when determine a classification score CSi for a particular abnormality, the image classifier can use one or more of the determined image quality features IQF determined by the quality assessment module. The use of these bound quality variables enables the image classifier IC to make a more accurate classification, as demonstrated in several concrete examples below.

Generally, a classification scores CSi for an abnormality is represented by a number, e.g., a continuous value in a certain range, e.g., between 0 (abnormality not present in image) and 1 (abnormality present in image). It is however also possible to have classification scores CSi on a categorical scale, e.g., on 5-point scale (very low/low/medium/high/very high) or a n-point scale more generally.

Although shown as a single image classifier IC possibly providing multiple classification scores CSi, it will be understood that the image classifier may be implemented as a combination of respective, and possibly partially overlapping, subcomponents that are used to determine the respective classification scores CSi.

Based on the determined classification scores CSi, a classification result CSR, 360, may be output. The FIG. illustrates classification result CSR comprising the classification scores, but the classification score may also be otherwise based on the classification results, e.g., it may represent a subset of abnormalities for which the classification scores CSi exceeded given (e.g., user-configured) thresholds.

FIG. 3b shows a detailed, yet non-limiting, example of applying an image classifier comprising a classification part and a correction part.

The FIG. shows an image classifier IC, 347, that can be used to determine a classification score CSi, 357, for an abnormality based on an x-ray image XRI, 310, and one or more image quality features IQF1, . . . , IQFk, 330. For example, image classifier IC may be used as image classifier 340 in FIG. 3a. The image quality features IQF1, . . . , IQFk used to determine a particular classification score CSi may be all image quality features 330 of FIG. 3*a* or a subset relevant to the abnormality at hand.

In this example, classification score CSi is determined using a classification part CLPi, 371, and a correction part CRPi, 373, of the image classifier.

By applying classification part CLPi of the image classifier IC to the x-ray image XRI, a preliminary classification score PCSi, 372, for the abnormality, may be obtained. The classification part CLPi can for example be a conventional image classification model. The classification part CLPi can be an existing model trained pre-trained to detect the abnormality at hand without the use of image quality features. The classification part CLPi can also be trained specifically for use with the correction part, however, e.g., optimized such that applying it and then correcting it using the correction part provides the most accurate results. For example, a neural network such as a deep or convolutional neural network may be used.

By applying correction part CRPi, 373, of the image classifier IC to at least the image quality features IQFi, a correction value CVi, 374 for the preliminary classification score PCSi may be obtained. Generally, the correction value may be represented as a number, e.g., between −1 (classification score is strongly reduced) or 1 (classification score is strongly boosted), or categorically, e.g., reduce/keep/boost or a more fine-grained categorization.

In principle, any time of machine learnable function can be used for the correction part, e.g., a neural network, a decision tree, a rule-based system, etc.

In various embodiments, however, the correction part may be a rule-based model, wherein the rules are based on clinical knowledge. This rule-based system is referred to as a clinical knowledge reasoning module. The clinical knowledge reasoning module may be based on a clinical knowledge graph linking quality aspects of the image to impact on abnormality detection.

The clinical reasoner may use the bound quality variables IQFi determined by the quality assessment module and combines them with the relevant clinical rules so that the resulting classification can be adjusted accordingly.

A concrete example of a rule of the rule-based system may be described in words as follows: "if poor inspiration is detected, then mitigate the increased probability of false appearance of pulmonary edema". For example, if the classifier part CLPi flags a pulmonary edema abnormality while the quality assessment module detects poor inspiration IQFi, medical practice teaches that this is likely to be a false positive, and the resulting score PCSi of the classifier part CLPi may be adjusted accordingly.

The correction part CRPi can have additional inputs in addition to the image quality features. As illustrated by the dashed line between the x-ray image XRI and the correction part CRPi, these additional inputs can include for example context information from an imaging request associated with the x-ray image XRI, and/or metadata (e.g., DICOM data) associated with the x-ray image XRI. However, the correction part CRPi generally does not use image data of the x-ray image XRI itself.

In a correction operation CORRi, 375, the correction value CVi may be applied to the preliminary classification score PCSi to obtain the classification score CSi for the abnormality. The correction value is applied in a way that is suitable to the representation of the correction value, e.g., by addition or multiplication (usually subject to a minimum or maximum). As a concrete example, when using a 5-point scale (strongly reduce, reduce, keep, boost, strongly boost) for the correction value, and values between 0 and 1 for the classification score c, the classification score may be corrected as follows:

$$c_{corrected} = \begin{cases} \max(c - 0.2, 0): \text{ if strongly reduce} \\ \max(c - 0.1, 0): \text{ if reduce} \\ c: \text{ if keep} \\ \min(c + 0.1, 1): \text{ if boost} \\ \min(c + 0.2, 1): \text{ if strongly boost} \end{cases}$$

As another example, the correction value may indicate the presence of a potential false positive. In this case, if the classification score does not exceed a certain threshold, a false positive may be flagged. For example, the correction may be performed as follows:

$$c_{corrected} = \begin{cases} 0: \text{ if potential false positive and } c < 0.7 \\ c: \text{ otherwise} \end{cases}$$

Accordingly, as the examples demonstrate, the classification score may be increased if the determined image quality features IQFi indicated an increased confidence in detecting the abnormality and/or decreased if the determined image quality features indicate a decreased confidence in detecting the abnormality.

FIG. 3*c* shows a detailed, yet non-limiting, example of applying an image classifier comprising a feature extractor and a neural network.

The FIG. shows an image classifier IC, 348, that can be used to determine a classification score CSi, 358, for an abnormality based on an x-ray image XRI, 310, and one or more image quality features IQF1, . . . , IQFk, 330. For example, image classifier IC may be used as image classifier 340 in FIG. 3*a*. The image quality features IQF1, . . . , IQFk used to determine a particular classification score CSi may be all image quality features 330 of FIG. 3*a* or a subset relevant to the abnormality at hand.

In this example, classification score CS is determined by applying a feature extraction part FX, 381, of the image classification model to the x-ray image XRI to obtain image features IF1, . . . , IFl, 382, of the x-ray image XRI, and applying a neural network NN, 383, to the image features and the image quality features to obtain the classification score for the abnormality. The feature extraction part FX may be a conventional feature extractor, e.g., trained jointly with the neural network NN, trained separately (e.g., as an encoder part of an autoencoder), or being pre-trained. Also the extraction of the image quality features IQFi may be co-trained with the abnormality classifier NNi.

For example, the feature extraction part FX may output a feature vector IFi of at most or at least 10, at most or at least 50, or at most or at least 100 features. The neural network NN can for example be a multi-layer perceptron or similar. Instead of a neural network, also another machine-learnable function can be used, such as a decision tree, a support vector machine, etc.

Figure 4:
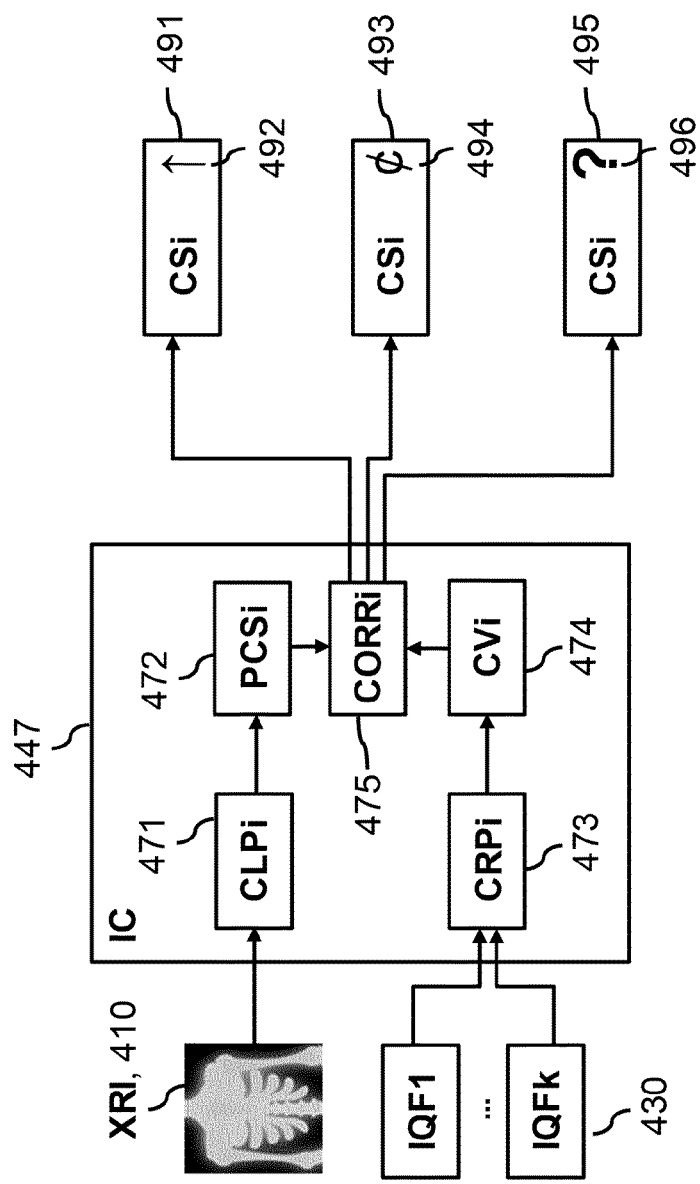
FIG. 4 shows a detailed example of applying an image classifier that provides interpretability information.

FIG. 4 shows a detailed, yet non-limiting, example of applying an image classifier. This example demonstrates various effects that using determined image quality features can have on a determined classification score for an abnormality. The example also illustrates how, optionally, interpretation information on how the image quality features affected the classification score, may be included in a classification result. For example, the classification result may be shown on a screen (e.g. in a specific UI element), or included in a produced report, e.g., a pre-filled report (e.g., in the form of a PDF file, a web page provided to a client, EMR data, etc.).

Shown in the FIG. is an x-ray image XRI, 410, to which an image classifier IC, 430, is applied to determine classification scores for one or more abnormalities. The image classifier IC uses image quality features IQF1, . . . , IQFk, 430, determined for x-ray image XRI. For example, the image classifier IC may correspond to image classifier 340 of FIG. 3a, image classifier 347 of FIG. 3b, or image classifier 348 of FIG. 3c.

In particular, the FIG. illustrates the image classifier IC determining a classification score for a particular abnormality. The example shows three different alternative ways in which this classification score CSi may be affected by the image quality features IQFi, represented by respective classification scores 491-493. Although an x-ray image XRI is typically only affected in one of these ways, combinations are sometimes possible. For example, an abnormality may be rejected as a false positive as well as remain undetected.

In the example below, image classifier IC is based on image classifier 347 of FIG. 3b. In particular, classification score CSi may be determined by applying a classification part CLPi, 471, to the x-ray image XRI to obtain preliminary classification score PCSi, 472. A correction part CRPi, 473, of the image classifier IC may be applied to at least the image quality features IQFi, to determine a correction value CVi, 474, for the preliminary classification score PCSi. The correction value CVi may then be applied to the preliminary classification score PCSi to obtain the classification score CSi. The various options discussed with respect to FIG. 3b also apply to this FIG., and vice versa. Moreover, the options discussed with respect to this FIG. can also apply to other ways of determining classification scores, e.g., as discussed with respect to FIG. 3c; and as mentioned respective ways of determining classification scores can be used for respective abnormalities.

One way in which a classification score may be affected by the image quality features IQFi, is that the image classifier IC boosts a classification score CSi, 491, e.g., causes the classification score CSi to more strongly indicate a presence of an abnormality. For example, as also discussed elsewhere, this can be due to image quality features IQFi which indicate an increased suitability (e.g., better than average) of the image for the detection of an abnormality. For example, correction operation CORRi may be configured to output a classification score CSi that is larger than preliminary classification score PCSi. As a concrete example, an original classification score indicating a confidence of 0.91 of the presence of cardiomegaly may be boosted to indicate a confidence of 0.96. For example, boosting the classification score may cause the abnormality to be detected, e.g., because of the classification score CSi exceeding a threshold.

In cases where the classification score CSI for an abnormality is boosted, the classification result may include an indication of the boosting for the abnormality. This is illustrated by the upward arrow 492 in the FIG. This way, the user gets better feedback on how the classification score CSi was arrived at. This feedback can be improved even more by including more specific information about the boosting of the abnormality. For example, correction data CVi, a difference between classification score CSi and preliminary classification score PCSi, or similar, may be included in the classification result. When using a rule-based model to determine the correction value CVi, also rules used to determine the correction value CVi, e.g., rules that fired, may be included in the classification result.

Conversely, a classification score CSi, 493, may be determined that is reduced, e.g., less strongly indicates the presence of the abnormality. For example, this can be due to image quality features IQFi indicating a decreased suitability of the image XRI for the detection of the abnormality, e.g., due to the image quality features IQFi indicating an increase probability of a false appearance of the abnormality. For example, correction operation CORRi may decrease preliminary classification score PCSi to arrive at classification score CSi. The reduction of the classification score may for example cause the abnormality not to be detected, e.g., to be rejected as a false positive. For example, say pulmonary edema is detected with a confidence of 0.66. The image quality features may indicate poor inspiration/low volume. As a consequence, for example due to the firing of a rule, pulmonary edema may be rejected as a false positive.

Also in cases where the classification score is reduced and/or the abnormality rejected as a false positive due to the image quality features IQFi, an indication of this may be included in the classification result, as illustrated by the crossed-out c symbol ¢, 494, shown in the FIG. Also here, additional feedback such as a correction value CVi, a difference between preliminary classification score PCSi and classification score CSi, rules leading to the reduction of the classification score, etc., may be included in the classification result.

Another possibility is that a certain abnormality may be undetected to image quality. Thus, the classification score CSI, 495, may not indicate that the abnormality is present, but there is an increased probability that this is a false negative. In such cases, it may be determined that the abnormality may be undetected due to image quality, based on the image quality features IQFi. For example, this may be done using a rule-based model, e.g., the same rule-based model used to determine the correction values CVi or an additional one. The abnormality may then be flagged as being possibly undetected in the classification result. This is illustrated in the FIG. by a flag shown alongside the classification score, in this case a question mark ?, 496.

Accordingly, by flagging this abnormality, an explanation based on the image quality features IQFi may be given why a certain anomaly (like pneumothorax) has a low score. For example, in some cases, doctors make an x-ray in order to rule out that certain pathologies are present. In these cases, a system that, by flag ?, indicates that a certain pathology cannot be ruled out due to low image quality, is useful, e.g., it may trigger an x-ray retake with specific instructions about how to improve the quality, thus resulting in false negative reduction.

If a rule-based model is used, then rules used by the rule-based model to determine that the abnormality may be undetected, e.g., fired rules, may be included in the classification result as well. Accordingly, by including the indication and/or the rules, transparency with respect to undetectable abnormalities may be improved. For example, if deemed necessary, a clinical expert can order an extra imaging exam or another diagnostic test to exclude potentially missed abnormalities as a result of the provided information.

Generally, the various models presented herein (e.g., image classifiers and their components, and feature extractors), may each be parameterized by respective sets of parameters. For example, the number of parameters of a model may be at least 1000, at least 10000, or at least 100000. For example, a model may be a neural network. Neural networks are also known as artificial neural networks. Examples include deep neural networks and convolutional neural networks. In this case, the set of parameters may comprise weights of nodes of the neural network. For example, the number of layers of the model may be at least 5 or at least 10, and the number of nodes and/or weights may be at least 1000 or at least 10000. Depending on the particular model and application, various known architectures for neural networks and other types of machine learnable models may be used. It is beneficial from the point of view of efficiency of training to use a generative model which is amenable to gradient-based optimization, e.g., which is continuous and/or differentiable in its set of parameters.

Typically, training is performed using stochastic approaches such as stochastic gradient descent, e.g., using the Adam optimizer as disclosed in Kingma and Ba, "Adam: A Method for Stochastic Optimization" (available at https://arxiv.org/abs/1412.6980 and incorporated herein by reference). As is known, such optimization methods may be heuristic and/or arrive at a local optimum. Training may be performed on an instance-by-instance basis or in batches, e.g., of at most or at least 64 or at most or at least 256 instances.

Figure 5:
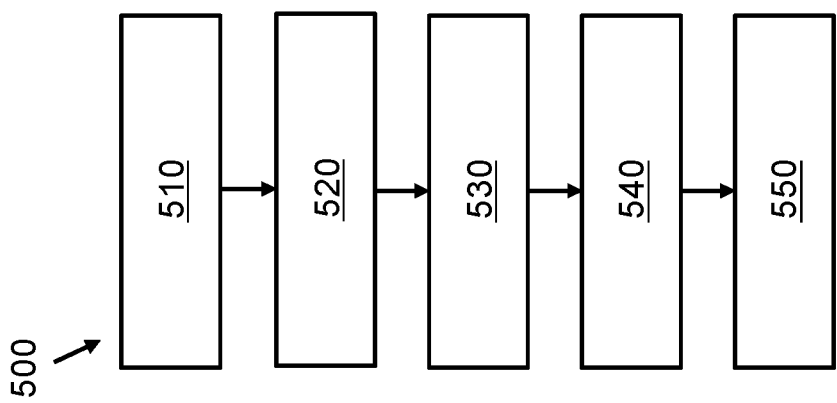
FIG. 5 shows a computer-implemented method of training an image classifier.

FIG. 5 shows a block-diagram of computer-implemented method 500 of detecting one or more abnormalities in an x-ray image. The method 500 may correspond to an operation of the system 200 of FIG. 2. However, this is not a limitation, in that the method 500 may also be performed using another system, apparatus or device.

The method 500 may comprise, in an operation titled "ACCESS CLASSIFIER, IMAGE QUALITY FEATURE EXTRACTORS", accessing 510 model data. The model data may include data representing an image classifier configured to determine classification scores for the one or more abnormalities from the x-ray image. The model data may further include data representing one or more feature extractors configured to extract respective image quality features from the x-ray image indicative of an image quality of the x-ray image.

The method 500 may comprise, in an operation titled "OBTAIN X-RAY IMAGE", obtaining 520 the x-ray image.

The method 500 may comprise, in an operation titled "DETERMINE IMAGE QUALITY FEATURES", applying 530 the one or more feature extractors to the x-ray image to determine the respective image quality features for the x-ray image.

The method 500 may comprise, in an operation titled "APPLY IMAGE CLASSIFIER USING IMAGE QUALITY FEATURES", applying 540 the image classifier to the x-ray image to determine the classification scores for the one or more abnormalities. The image classifier may use the determined image quality features to determine said classification scores.

The method 500 may comprise, in an operation titled "OUTPUT CLASSIFICATION RESULT", outputting 550 a classification result based on the determined classification scores.

Figure 6:
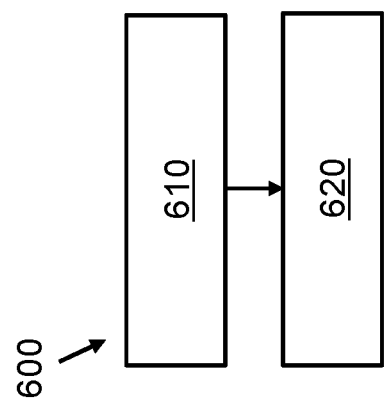
FIG. 6 shows a computer-implemented method of detecting abnormalities.

FIG. 6 shows a block-diagram of computer-implemented method 600 of training an image classifier to detect one or more abnormalities in an x-ray image. The method 600 may correspond to an operation of the system 100 of FIG. 1. However, this is not a limitation, in that the method 600 may also be performed using another system, apparatus or device.

The method 600 may comprise, in an operation titled "ACCESS TRAINING DATA INCLUDING IMAGE QUALITY FEATURES", accessing 610 training data comprising multiple training images. A training image may be labelled with one or more image quality features and/or one or more abnormalities.

The method 600 may comprise, in an operation titled "TRAIN IMAGE CLASSSIFIER USING IMAGE QUALITY FEATURES", training 620 the image classifier to, given a training image and using the one or more image quality features that the training image is labelled with, detect the one or more abnormalities that the training image is labelled with.

It will be appreciated that, in general, the operations of method 500 of FIG. 5 and method 600 of FIG. 6 may be performed in any suitable order, e.g., consecutively, simultaneously, or a combination thereof, subject to, where applicable, a particular order being necessitated, e.g., by input/output relations. Some or all of the methods may also be combined, e.g., method 500 of detecting abnormalities using in image classifier may be applied subsequently to the classifier being trained according to method 600.

Figure 7:
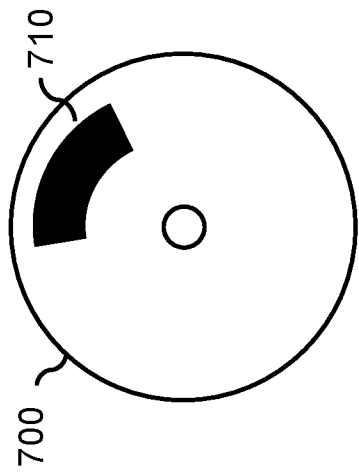

The method(s) may be implemented on a computer as a computer implemented method, as dedicated hardware, or as a combination of both. As also illustrated in FIG. 7, instructions for the computer, e.g., executable code, may be stored on a computer readable medium 700, e.g., in the form of a series 710 of machine-readable physical marks and/or as a series of elements having different electrical, e.g., magnetic, or optical properties or values. The executable code may be stored in a transitory or non-transitory manner. Examples of computer readable mediums include memory devices, optical storage devices, integrated circuits, servers, online software, etc. FIG. 7 shows an optical disc 700. Alternatively, the computer readable medium 700 may comprise transitory or non-transitory data 710 representing an image classifier for detecting one or more image abnormalities in an x-ray image trained according to a computer-implemented method described herein.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. Expressions such as "at least one of" when preceding a list or group of elements represent a selection of all or of any subset of elements from the list or group. For example, the expression, "at least one of A, B, and C" should be understood as including only A, only B, only C, both A and B, both A and C, both B and C, or all of A, B, and C. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The following numbered clauses include embodiments that are contemplated and nonlimiting:

Clause 1. A system for detecting one or more abnormalities in an x-ray image, the system comprising:

a data interface for accessing model data, wherein the model data includes data representing an image classifier configured to determine classification scores for the one or more abnormalities from the x-ray image, and wherein the model data further includes data representing one or more feature extractors configured to extract respective image quality features from the x-ray image indicative of an image quality of the x-ray image;

an input interface for obtaining the x-ray image;

a processor subsystem configured to:

apply the one or more feature extractors to the x-ray image to determine the respective image quality features for the x-ray image;

apply the image classifier to the x-ray image to determine the classification scores for the one or more abnormalities, wherein the image classifier uses the determined image quality features to determine said classification scores;

output a classification result based on the determined classification scores.

Clause 2. A computer-implemented method of detecting one or more abnormalities in an x-ray image, the method comprising:

accessing model data, wherein the model data includes data representing an image classifier configured to determine classification scores for the one or more abnormalities from the x-ray image, and wherein the model data further includes data representing one or more feature extractors configured to extract respective image quality features from the x-ray image indicative of an image quality of the x-ray image;

obtaining the x-ray image;

applying the one or more feature extractors to the x-ray image to determine the respective image quality features for the x-ray image;

applying the image classifier to the x-ray image to determine the classification scores for the one or more abnormalities, wherein the image classifier uses the determined image quality features to determine said classification scores;

outputting a classification result based on the determined classification scores.

The invention claimed is:

1. A system for detecting one or more abnormalities in a medical image, wherein an abnormality of the one or more abnormalities is indicative of a pathology, a disease or a clinical finding present in the medical image, the system comprising:

a data interface for accessing model data, wherein the model data includes data representing an image classifier trained to use one or more image quality features to determine classification scores for the one or more abnormalities from the medical image, and wherein the model data further includes data representing one or more feature extractors configured to extract the respective image quality features from the medical image indicative of a suitability of the medical image for detection of the one or more abnormalities;

an input interface for obtaining the medical image; and a processor subsystem configured to:

apply the one or more feature extractors to the medical image to determine the respective image quality features for the medical image;

apply the image classifier to the medical image to determine the classification scores for the one or more abnormalities, wherein the image classifier uses the determined image quality features to determine said classification scores; and output a classification result based on the determined classification scores, wherein the processor subsystem is configured to determine a classification score for an abnormality by:

applying a classification part of the image classifier to the medical image to obtain a preliminary classification score for the abnormality;

applying a correction part of the image classifier to at least the image quality features to determine a correction value for the preliminary classification score; and applying the correction value to the preliminary classification score to obtain the classification score for the abnormality.

2. The system of claim 1, wherein an image quality feature represents a type of view of the medical image, a rotation degree of the medical image subject with respect to the plane of the medical image, a degree of inspiration indicating a presence of an adequately inspired volume in the medical image, or a degree of penetration indicating an adequacy of exposure of the medical image.

3. The system of claim 1, wherein applying the correction part comprises applying a rule-based model to at least the determined image quality features.

4. The system of claim 1, wherein the processor subsystem is configured to determine a classification score for an abnormality by applying a feature extraction part of the image classification model to the medical image to obtain image features of the medical image, and applying a neural network to the image features and the image quality features to obtain the classification score for the abnormality.

5. The system of claim 1, wherein the processor subsystem is configured to include correction data in the classification result indicating an effect of the image quality features on the classification score.

6. The system of claim 1, wherein the processor subsystem is further configured to determine, based on the one or more image quality features, a subset of abnormalities that may be undetected due to image quality, and to output said subset of abnormalities as part of the classification result.

7. The system of claim 6, wherein the processor subsystem is configured to determine said subset based on applying a rule-based model, the processor subsystem being further configured to include rules used by the rule-based model to determine that an abnormality may be undetected in the classification result.

8. The system of claim 1, further comprising an output interface for outputting the classification result in a sensory-perceptible manner to a user.

9. The system of claim 1, further comprising:

a second data interface for accessing training data comprising multiple training images, a training image being labelled with one or more image quality features and one or more abnormalities;

a second processor subsystem configured to train the image classifier to, given a training image and using the one or more image quality features that the training image is labelled with, detect the one or more abnormalities that the training image is labelled with.

10. The system of claim 9, wherein the image classifier comprises a correction part configured to determine a correction value for a preliminary classification score according to a rule-based model, the processor subsystem being configured to determine a threshold for a rule of the rule-based system based on the training data.

11. A computer-implemented method of detecting one or more abnormalities in an medical image, wherein an abnormality of the one or more abnormalities is indicative of a pathology, a disease or a clinical finding present in the medical image, the method comprising:

accessing model data, wherein the model data includes data representing an image classifier trained to use one or more image quality features to determine classification scores for the one or more abnormalities from the medical image, and wherein the model data further includes data representing one or more feature extractors configured to extract the respective image quality features from the medical image indicative of a suitability of the medical image for detection of the one or more abnormalities;

obtaining the medical image;

applying the one or more feature extractors to the medical image to determine the respective image quality features for the medical image;

applying the image classifier to the medical image to determine the classification scores for the one or more abnormalities, wherein the image classifier uses the determined image quality features to determine said classification scores; and outputting a classification result based on the determined classification scores, wherein a classification score is determined for an abnormality by:

applying a classification part of the image classifier to the medical image to obtain a preliminary classification score for the abnormality;

applying a correction part of the image classifier to at least the image quality features to determine a correction value for the preliminary classification score; and applying the correction value to the preliminary classification score to obtain the classification score for the abnormality.

12. The method of claim 11, further comprising training the image classifier to detect the one or more abnormalities in the medical image by:

accessing training data comprising multiple training images, a training image being labelled with one or more image quality features and one or more abnormalities; and training the image classifier to, given a training image and using the one or more image quality features that the training image is labelled with, detect the one or more abnormalities that the training image is labelled with.

13. A non-transitory computer readable medium storing instructions that, when executed by one or more processors, cause the one or more processors to:

access model data, wherein the model data includes data representing an image classifier trained to use one or more image quality features to determine classification scores for one or more abnormalities from a medical image, and wherein the model data further includes data representing one or more feature extractors configured to extract respective image quality features from the medical image indicative of a suitability of the medical image for detection of the one or more abnormalities;

obtain the medical image;

apply the one or more feature extractors to the medical image to determine the respective image quality features for the medical image;

apply the image classifier to the medical image to determine the classification scores for the one or more abnormalities, wherein the image classifier uses the determined image quality features to determine said classification scores; and output a classification result based on the determined classification scores, wherein the instructions, when executed by one or more processors, cause the one or more processors to determine a classification score for an abnormality by:

applying a classification part of the image classifier to the medical image to obtain a preliminary classification score for the abnormality;

applying a correction part of the image classifier to at least the image quality features to determine a correction value for the preliminary classification score;

applying the correction value to the preliminary classification score to obtain the classification score for the abnormality.

14. The non-transitory computer readable medium of claim 13, wherein an image quality feature represents a type of view of the medical image, a rotation degree of the medical image subject with respect to the plane of the medical image, a degree of inspiration indicating a presence of an adequately inspired volume in the medical image, or a degree of penetration indicating an adequacy of exposure of the medical image.

15. The non-transitory computer readable medium of claim 13, wherein applying the correction part comprises applying a rule-based model to at least the determined image quality features.

16. The non-transitory computer readable medium of claim 13, wherein the instructions, when executed by the one or more processors, further cause the one or more processors to: determine a classification score for an abnormality by applying a feature extraction part of the image classification model to the medical image to obtain image features of the medical image, and applying a neural network to the image features and the image quality features to obtain the classification score for the abnormality.

17. The non-transitory computer readable medium of claim 13, wherein the instructions, when executed by the one or more processors, further cause the one or more processors to: include correction data in the classification result indicating an effect of the image quality features on the classification score.

18. The non-transitory computer readable medium of claim 13, wherein the instructions, when executed by the one or more processors, further cause the one or more processors to: determine, based on the one or more image quality features, a subset of abnormalities that may be undetected due to image quality, and to output said subset of abnormalities as part of the classification result.

19. The non-transitory computer readable medium of claim 18, wherein the instructions, when executed by the one or more processors, further cause the one or more processors to: determine the subset based on applying a rule-based model, the processor subsystem being further configured to include rules used by the rule-based model to determine that an abnormality may be undetected in the classification result.

20. The non-transitory computer readable medium of claim 13, wherein the image classifier comprises a correction part configured to determine a correction value for a preliminary classification score according to a rule-based model.

* * * * *